Patented June 12, 1951

2,556,953

UNITED STATES PATENT OFFICE 2,556,953

BARIUM PERBORATE

James H. Young, Niagara Falls, N. Y., assignor to E. I. du Pont de Nemours & Company, Wilmington, Del., a corporation of Delaware No Drawing. Application July 9, 1947,
Serial No. 759,915

4 Claims. (Cl. 252—363.5)

This invention relates to the preparation of barium perborate and more particularly to a form of barium perborate which is readily dispersible in organic compounds.

It has been proposed to incorporate in vinyl resins, such as polyvinyl chloride, solid metal perborates to act as stabilizers. Barium perborate is well suited for this purpose. However, to obtain the maximum advantage of the barium perborate and to avoid impairment of physical properties of the vinyl resin, it is desirable to utilize a grade of perborate which will readily disperse in organic compounds to produce highly stable dispersions. In some cases relatively clear, translucent to transparent dispersions are desirable. In one method for incorporating barium perborate in a vinyl resin, the perborate may be dispersed in an organic compound which is a plasticizer for the resin, e. g., tricresyl phosphate, and the resulting dispersion incorporated in the resin in a conventional manner. Dispersions may also be made in plasticizers or mixtures of resins and plasticizers which are normally liquids or normally solids; in the latter event, the perborate is dispersed in the molten plasticizer or mixture.

It has long been known that barium perborate can be made by reacting a barium salt with an alkali metal perborate. In such preparations water soluble barium salts are used and the resulting perborate generally is insoluble and is obtained as a precipitate. However, barium perborate produced by methods heretofore known is generally difficult to disperse in organic substances and generally fails to produce the clear dispersions which are required for the stabilization of vinyl resins as described above. For example, a process has been proposed for the preparation of $Ba(BO_3)_2.7H_2O$ (Berichte 31, 954 (1898)). This heptahydrate melts and decomposes readily and is unfit for storage. Its dispersions in organic compounds contain undesirably large amounts of water and are cloudy. It is expensive to process because very large amounts of water are necessary to produce very small weights of product. This perborate does not give clear dispersions in vinyl resin plasticizers or other organic compounds.

An object of the invention is to produce a grade of barium perborate which is readily dispersible in organic compounds and in particular so as to produce relatively clear dispersions. The invention includes an improved novel process for producing barium perborate and, as a new composition of matter, a particular grade of barium perborate which meets the requirements mentioned above. Still other objects will be apparent from the following description of my invention.

The aforesaid objects may be attained in accordance with the present invention by reacting a water soluble barium salt with an inorganic peroxide and a soluble borate in an aqueous alkaline solution at a temperature of 40 to 60° C. and removing the resulting precipitated barium perborate. I have discovered that the reaction temperature is an important factor in producing a grade of barium perborate which is readily dispersible in organic substances to produce clear dispersions. In order to attain this result I found that it is necessary to maintain a reaction temperature not lower than about 40° C. At lower temperatures, the reaction to form barium perborate proceeds readily, but the resulting precipitated product is not readily dispersible in organic substances to produce stable dispersions. At temperatures above 60° C., suitable dispersible products are obtained, but at such elevated temperatures undue decomposition of peroxide and perborate occur so that it is difficult to obtain a product having a suitable amount of active oxygen.

The following examples illustrate specific modes of practicing the invention.

EXAMPLE 1

200 g. of borax ($Na_2B_4O_7.10H_2O$) and 37.4 g. of sodium peroxide ($Na_2O_2$) were mixed and added to 4 liters of water with stirring. 112 g. of 130 vol. (35.0%) $H_2O_2$ solution was then added. To this solution at 59° C., a solution of 244 g. of $BaCl_2.2H_2O$ was added with stirring over a period of 7 minutes. Stirring was continued 1 hour. The slurry was then filtered and washed thoroughly with water and dried in a brisk stream of air at 40–50° C. for 24–48 hours. 271 g. of dry product was recovered, which was found to be a perborate that can be designated as barium metaborate perhydrate-hydrate having the formula shown below:

*Analysis (per cent by weight)*

| BaO | $B_2O_3$ | Active O | $H_2O_2$ | $H_2O$ | Approximate Composition Calculated |
|---|---|---|---|---|---|
| Per cent 51.17 | Per cent 24.74 | Per cent 7.9 | Per cent 16.8 | Per cent 7.4 | $Ba(BO_2)_2.1.5 H_2O_2.H_2O$ |

The dry product is a fine powder having good stability at 25–30° C. and fair stability at 50° C. Tests were made by mixing it with tricresyl phosphate. The product dispersed quickly and completely to give good, stable dispersions in proportions of 10 to 40% by weight.

EXAMPLE 2

Proceeding in accordance with Example 1, a barium meta-borate perhydrate-hydrate was precipitated. When precipitation had been completed, 2 cc. of tricresyl phosphate was added and thoroughly stirred into the slurry. The batch then was filtered, washed and dried for 16 hours at 53° C. and for 6 additional hours at 60° C. 273 g. of dry product containing 7.5% active oxygen was recovered. This was a fine powder, the particles of which were coated with tricresyl phosphate.

Tests with tricresyl phosphate dispersions as in Example 1 showed an exceptionally rapid wet-through and particularly clear dispersions, in proportions of 10 to 50% by weight of the barium perborate.

The formula of the product as shown in Example 1 indicates a perhydrate, rather than a true persalt in which the active oxygen is part of the borate anion. However, I have not determined whether or not the product is a true persalt in which the active oxygen is contained in the borate anion or whether it is a perhydrate having the active oxygen in a hydrogen peroxide molecule which is combined with the borate, as shown in the above formula. It is also possible that this product may be a mixture of barium perborates (or barium borate perhydrates) having different degrees of hydration. In any event, if the product be considered a borate perhydrate, it has about 1.5 mole combined $H_2O_2$ and 1 mole combined $H_2O$ (water of hydration) per barium atom. If it is considered a true perborate (barium salt of the hypothetical $HBO_3$) it has about 2.5 moles of combined $H_2O$ per barium atom.

In practicing the invention the proportions of borax, sodium peroxide and hydrogen peroxide may be varied considerably without departing from the scope of the present invention. In place of sodium peroxide I may use equivalent quantities of hydrogen peroxide and a suitable alkali, such as caustic soda. The invention is also not restricted to using caustic soda as the alkaline material, but other alkalies, for example, the hydroxides of potassium, lithium, rubidium and cesium, may be used as well. Likewise, other alkali metal peroxides and borates may be used in place of sodium peroxide and borax. As will be obvious to chemists, the invention is not restricted to borax or other alkali metal borates, but equivalents such as metaborates and boric acid can be used instead, and the amount of alkali added as alkali metal peroxide or hydroxide will vary depending on the alkalinity of the borate used.

The composition of the barium perborate precipitate will depend in large measure on the proportions of the reactants utilized and the reaction temperature. In carrying out the reaction with sodium peroxide, hydrogen peroxide and borax, preferably the reaction mixture will contain at least one mole of borax for each mole of sodium peroxide. Generally, I prefer a 2 to 10 mole-per cent excess of the borax. The reaction mixture also preferably will contain at least 1.5 moles of hydrogen peroxide per mole of sodium peroxide and this may vary from 1.5 to 2 moles. The water present may vary from about 100 to 400 moles per mole of sodium peroxide. For example, the preferred proportions of the reactants will be approximately:

|  | Moles |
|---|---|
| Sodium peroxide | 1 |
| Hydrogen peroxide | 1.5 to 2 |
| Borax | 1 to 1.1 |
| Water | 100 to 400 |
| Barium salt | 1.8 to 2.2 |

The amount of barium salt added to the reaction mixture is not critical, provided sufficient is added to cause precipitation of barium perborate at the reaction temperature. I prefer to add approximately the theoretical proportion of the barium salt, that is, about 2 moles, per mole of borax reacted, or a small excess thereover. If less than the theoretical amount of barium salt is added, the yield based on active oxygen is correspondingly decreased; however, a small amount of barium salt, as low as 0.1 mole, will cause some product to precipitate. If more than the theoretical amount is added, the excess barium salt appears in the filtrate after removing the precipitated product.

Also I prefer to utilize 100–400 moles of water and a sufficiently high temperature (at least 40° C.) so that sodium perborate will not precipitate. Higher operating temperatures also minimize excessive hydration.

Washing with water to remove soluble salts is preferred. Generally, 10–20 washings will suffice to remove soluble salts to a desirable level of 0.5–1.0%.

Drying is not critical. It may be conducted on tray driers, spray driers, rotary driers or on drum driers. For tray and rotary drying, a temperature of 40–70° C. and thin films are preferred. For more rapid drum drying, temperatures of 130–140° C. are suitable.

Contamination with large amounts of heavy metal salts should be avoided. Suitable processing equipment may be wood, glass, stainless steel or Monel.

The novel barium perborate of my invention is not limited to the product of Example 1, but products containing somewhat more and less of active oxygen and of water of hydration may be obtained. The composition of such products is conveniently expressed by a perhydrate formula like that of Example 1, or the product may be considered to be a mixture of barium perborate hydrate and barium meta-borate (which may or may not be hydrated), which hydrated compounds could be expressed by formulas such as $Ba(BO_3).nH_2O$ and $Ba(BO_2)_2.mH_2O$, where $n$ and $m$ are integers. For convenience, I prefer to express the composition of the novel products by the perhydrate formula:

$$Ba(BO_2)_2.xH_2O_2.yH_2O$$

The active oxygen content and degree of hydration may vary as expressed by this formula when $x$ and $y$ represent any quantities within the limits:

for $x$: from 1 to 2
for $y$: from 0 to 2

Thus the composition may vary from the monoperhydrate: $Ba(BO_2)_2.H_2O_2$ to the diperhydrate dihydrate: $Ba(BO_2)_2.2H_2O_2.2H_2O$.

These variations in composition can be expressed in terms of the conventional perborate formula $Ba(BO_3)_2$ thus: when $x$ is 1 and $y$ is 0, the product is an equimolar mixture of:

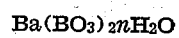

$$Ba(BO_3)_2.nH_2O$$

and $$Ba(BO_2)_2 \cdot mH_2O$$

where $n$ and $m$ each may be 0, 1 or 2, and the sum of $n+m$ equals 2.

When $x$ is 2 and $y$ is 2, the product is the perborate tetrahydrate:

$$Ba(BO_3)_2 \cdot 4H_2O$$

In other words, the ratio of barium borate to combined hydrogen oxides ($H_2O_2$ and $H_2O$) in the product may vary from 1:1 to 1:4.

The variation in active oxygen content expressed in the above formulas, i. e., a variation of about 5 to 10% by weight in the product, may be accomplished by correspondingly varying the active oxygen (peroxide) concentration in the reaction mixture. The variation in the degree of hydration of the product may be accomplished by varying the reaction temperature and drying temperature, increasing temperatures favoring lower hydration.

A preferred mode of practicing the invention is illustrated by Example 2, wherein organic liquid, e. g., tricresyl phosphate, is added to the precipitated product before it is removed from the reaction mixture. The result of such operation is to coat particles of the precipitate with the organic liquid, which coating I have found facilitates dispersion in the same or other liquid organic compounds compatible therewith. Several alternative methods may be utilized thus to coat the precipitate with a liquid organic compound, in all of which the organic compound is brought into contact with a wet precipitate. The organic compound may be added with the other ingredients to the reaction mixture so that it is present when the reaction forming the barium perborate occurs. When this method is utilized the organic compound selected must of course be one that is not readily oxidized by the peroxide present, under the reaction conditions. Another method is that shown in Example 2, wherein the organic compound is added after the barium perborate has precipitated but before it has been separated from the reaction mixture. Substantially the same result will be obtained by first filtering or separating the precipitated perborate from the reaction solution, then mixing the organic compound with the wet precipitate and subsequently drying, preferably with agitation.

While tricresyl phosphate has been added to coat the precipitate and improve its dispersions other water-insoluble non-volatile organic liquids or molten organic compounds will also serve. For this purpose I prefer to choose an organic compound which is suitable as a plasticizer for a vinyl resin. The amount of such organic compound may be varied from about 0.2 to 5% by weight. About 1%, based on the weight of the dry barium meta-borate hydrate-perhydrate is suitable.

Barium perborates made as described herein may be dispersed in the various organic compounds suitable as plasticizers for vinyl resins, in various proportions, up to 50% by weight, to give excellent dispersions. These include esters of organic acids such as phthalic, tartaric and succinic acids; the polyethylene glycol esters of the isomeric hexoic acids; and various glycol and polyglycol esters of other fatty acids, e. g., glycerol esters, glycerol acetal esters such as butyraldehyde acetal of glycerol monoacetate and the like. Other suitable plasticizers are the aryl phosphates such as tricresyl phosphate, triphenyl phosphate and the like; other esters of phosphoric acid, including alkyl, alicyclic and aralkyl esters; diphenyl propane, monomethyl toluene sulfonamide and thiocarbanilide. Various other compounds not specifically listed herein, which are known to be suitable as vinyl resin plasticizers are likewise included. Such compounds, many of which are liquids, are characterized by relatively high boiling points (above 100° C.) and by the fact that they can be mixed with vinyl resins to form homogeneous plastic compositions.

Barius perborates made as herein described, having a fineness of about 100 to 200 mesh size, are characterized by the ease with which they may be dispersed in liquid organic compounds, including the above mentioned plasticizers, by merely stirring, to produce relatively stable dispersions. When the refractive index of the organic compound is equal, or approximately equal to that of the perborate, such dispersions are substantially clear. Other forms of barium perborate, ground to an equal state of subdivision, I have found form distinctly less stable dispersions in the same organic compounds and form cloudy dispersions when the organic compound has substantially the same refractive index.

The term "vinyl resin" is used herein to denote polymers and copolymers of monoolefinic compounds having the vinyl group ($CH_2=CH-$) and derivatives thereof, e. g., chlorovinyl compounds. Examples are the polymers and copolymers of vinyl carboxylates, e. g., vinyl formate, vinyl acetate, vinyl propionate and vinyl benzoate; vinyl halides, e. g., vinyl chloride and vinyl bromide; and vinyl aryls, e. g., styrene. The term "vinyl resins" also includes products such as polyvinyl acetals, polyvinyl ethers, polyvinyl alcohols and the like.

While my invention is particularly useful for preparing dispersions of barium perborate in vinyl resin plasticizers and hence in vinyl resin compositions, other uses for the invention will be apparent. Thus the herein described improved method for making barium perborate and the product thereof make available a peroxygen product of relatively high oxygen content and good stability during storage, that may be used for various purposes where active oxygen compounds are generally applied, e. g., as polymerization catalyst, bleaching agent, oxidation of chemical compounds, and the like. In many of such uses, the improved dispersibility of the product in organic compounds is advantageous, for example, in bleaching oils, fats and waxes, in oxidation reactions and in many polymerization reactions.

I claim:

1. A composition of matter comprising a stable, homogeneous, substantially clear dispersion of a barium perborate corresponding approximately to the formula: $Ba(BO_2)_2 \cdot 1.5H_2O_2 \cdot H_2O$, in tricresyl phosphate.

2. As a new composition of matter a solid barium perborate composition which is dispersible in tricresyl phosphate merely by stirring therein in proportions of 10 to 50% by weight to produce a substantially clear dispersion, comprising a dried precipitate of barium perborate corresponding approximately to the formula $$Ba(BO_2)_2 \cdot 1.5H_2O_2 \cdot H_2O$$

each particle of which is coated with tricresyl phosphate.

3. The process for producing a barium perborate readily dispersible in an organic liquid which comprises reacting together at a temperature of 40 to 60° C. a water soluble barium salt, borax, sodium peroxide and hydrogen peroxide in water in the following proportions:

| | Moles |
|---|---|
| Sodium peroxide | 1 |
| Hydrogen peroxide | 1.5 to 2 |
| Borax | 1 to 1.1 |
| Barium salt | 1.8 to 2.2 |
| Water | 100 to 400 | to form a precipitate of barium perborate corresponding approximately to the formula:

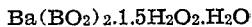

$$Ba(BO_2)_2.1.5H_2O_2.H_2O$$

mixing into the resulting slurry a small amount of tricresyl phosphate which have boiling points above 100° C., then removing and drying the precipitate.

4. The process for making a stable, homogeneous dispersion of barium perborate in an organic liquid which comprises reacting together at a temperature of 40 to 60° C. a barium salt, borax, and an aqueous alkaline hydrogen peroxide solution in proportions equivalent to:

| | Moles |
|---|---|
| Sodium peroxide | 1 |
| Hydrogen peroxide | 1.5 to 2 |
| Borax | 1 to 1.1 |
| Barium salt | 1.8 to 2.2 |
| Water | 100 to 400 | to form a precipitate of barium perborate corresponding approximately to the formula:

$$Ba(BO_2)_2.1.5H_2O_2.H_2O$$

mixing into the resulting slurry a small quantity of tricresyl phosphate, then removing and drying the precipitate, and stirring the dried precipitate with a sufficient quantity of said phosphate to form a dispersion therein.

JAMES H. YOUNG.

REFERENCES CITED

The following references are of record in the file of this patent:

UNITED STATES PATENTS

| Number | Name | Date |
|---|---|---|
| 999,497 | Gruter | Aug. 1, 1911 |
| 2,356,091 | Roedel | Aug. 15, 1944 |
| 2,422,153 | Nimwegen et al. | June 10, 1947 |

FOREIGN PATENTS

| Number | Country | Date |
|---|---|---|
| 193,559 | Germany | Oct. 14, 1903 |

OTHER REFERENCES

Ser. No. 293,101, Nees (A. P. C.), published Apr. 27, 1943.

Mattiello: Protective and Decorative Coating, vol. III, pp. 560 and 561.

Vinylyte Copolymer Resins for Surface Coating, published by Carbide and Carbon Chem. Co., N. Y., pp. 26 and 97.

Mellor: Treatise on Theoretical and Inorganic Chemistry, vol. 9, p. 120 (1924).

Gmelin-Kraut, 2.2 Handbuch der Organische Chemie, p. 99.